(12) United States Patent
Jose

(10) Patent No.: US 7,035,235 B2
(45) Date of Patent: Apr. 25, 2006

(54) SYSTEM AND METHOD FOR COMMUNICATING OVER A WIRELESS TIME-DIVISION DUPLEX CHANNEL

(75) Inventor: Jaku Jose, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 878 days.

(21) Appl. No.: 09/933,630

(22) Filed: Aug. 20, 2001

(65) Prior Publication Data
US 2003/0035382 A1 Feb. 20, 2003

(51) Int. Cl.
*H04Q 7/00* (2006.01)

(52) U.S. Cl. .............. 370/330; 370/338; 370/336; 370/346

(58) Field of Classification Search ........ 370/328–330, 370/336–338, 343–346, 347, 442, 478, 210, 370/449, 498, 480
See application file for complete search history.

(56) References Cited

U.S. PATENT DOCUMENTS

| | | | | |
|---|---|---|---|---|
| 5,918,164 A * | 6/1999 | Takahashi et al. | .......... | 455/134 |
| 6,553,078 B1 * | 4/2003 | Åkerberg | .......... | 375/267 |
| 6,650,630 B1 * | 11/2003 | Haartsen | .......... | 370/345 |
| 6,704,346 B1 * | 3/2004 | Mansfield | .......... | 375/136 |
| 6,834,192 B1 * | 12/2004 | Watanabe et al. | .......... | 455/444 |
| 6,859,450 B1 * | 2/2005 | Mansfield | .......... | 370/344 |

OTHER PUBLICATIONS

"The Specification of the Bluetooth System," Version 1.1, Feb. 22, 2001, pp. 1-1082.

* cited by examiner

*Primary Examiner*—Ricky Q. Ngo
*Assistant Examiner*—Nittaya Juntima
(74) *Attorney, Agent, or Firm*—McAndrews, Held & Malloy, Ltd.

(57) ABSTRACT

According to the present invention, the bandwidth of a TDD channel is increased where multiple slave devices communicate with a master device over the channel. According to an aspect of the present invention, the master device can increase channel bandwidth by utilizing available transmit slots that occur during receipt of a multi-slot packet from a slave device. For example, the master device receives a first packet at a first frequency from a first slave via the channel. The master determines whether the first packet is a multi-slot packet, and if so, transmits a second packet to a second slave via the channel at a second frequency different from the first frequency. The second packet is transmitted after receipt of the first packet, but prior to the end of the first packet.

18 Claims, 9 Drawing Sheets

400

SYSTEM AND METHOD FOR COMMUNICATING OVER A WIRELESS TIME-DIVISION DUPLEX CHANNEL

BACKGROUND

1. Field of the Invention

The present invention relates generally to wireless communications, and more particularly to a system and method for communicating over a time-division duplex (TDD) channel.

2. Discussion of the Related Art

In today's electronically interconnected world, the normal complement of electronic equipment in the home or business includes devices that are connected to one another in different ways. For example, many desktop computer systems have a central processing unit (CPU) connected to a mouse, a keyboard, a printer and so on. A personal digital assistant (PDA) will normally connect to the computer with a cable and a docking cradle. A television may be connected to a VCR and a cable box, with a remote control for all three components. A cordless phone connects to its base unit with radio waves, and it may have a headset that connects to the phone with a wire. In a stereo system, a CD player, tape player and record player connect to a receiver, which connects to speakers. These connections can be difficult to install and maintain, particularly for the lay user.

Alternatives to these conventional approaches to connectivity have been proposed. Bluetooth™ (BT) is a computing and telecommunications industry specification for connectivity that is both wireless and automatic, as described in *The Specification of the Bluetooth System*, Version 1.1, Feb. 22, 2001, ("the BT specification"), which is incorporated herein by reference. BT allows any sort of electronic equipment—from computers and cell phones to keyboards and headphones—to make its own connections, without wires, cables or any direct action from a user. Because BT connections are wireless, offices can be designed without regard to cable placement and users can travel with portable devices without having to worry about carrying a multitude of cables. These connections can be established automatically, where BT devices find one another and form a connection without any user input at all.

BT requires that a low-cost microchip transceiver be included in each device. The BT microchip transceiver communicates on a frequency of 2.45 GHz, which has been set aside by international agreement for the use of industrial, scientific and medical devices (ISM). In addition to data, up to three voice channels are available. Each BT device has a unique 48-bit device address from the Institute of Electrical and Electronics Engineers 802 standard. Connections can be point-to-point or multi-point. Data can be exchanged at a rate of 1 megabit per second (up to 2 Mbps in the second generation of the technology).

A number of common consumer devices also take advantage of the same RF band. Baby monitors, garage-door openers and some cordless phones all make use of frequencies in the ISM band. The BT design employs various techniques to reduce interference between these devices and BT transmissions. For example, BT avoids interfering with other systems by sending out relatively weak signals of 1 milliwatt. By comparison, some cell phones can transmit a signal of 3 watts. The low power limits the range of a BT device to about 10 meters, thereby reducing the probability of interference with other devices.

BT also employs a spread-spectrum frequency hopping scheme to further reduce interference and increase capacity. BT devices use 79 randomly chosen frequencies within a designated range, changing from one to another on a regular basis 1,600 times every second. The random frequency hopping pattern makes it unlikely that two BT transmitters will be on the same frequency at the same time, thus reducing the probably of BT devices interfering with one another. This technique also minimizes the risk that other non-BT devices such as portable phones or baby monitors will disrupt BT devices since any interference on a particular frequency will last only a fraction of a second.

When BT devices come within range of one another, an electronic conversation takes place to determine whether they have data to share or whether one needs to control the other. Once the conversation has occurred, the devices form a "piconet". A piconet may link devices located throughout a room, such as a home entertainment system, or devices much closer together such as a mobile phone on a belt-clip and a headset, or a computer, mouse, and printer. Once a piconet is established, the connected devices randomly hop frequencies in unison to communicate with one another and avoid other piconets that may be operating nearby.

One device acts as the master of the piconet, whereas the other unit(s) acts as slave(s). Up to seven slaves can be active in a single piconet. The slaves synchronize to the master's timing, and access to the channel is controlled by the master. The channel is represented by a pseudo-random hopping sequence hopping through the 79 RF channels. The hopping sequence is unique for each piconet and is determined by the BT device address of the master; the phase in the hopping sequence is determined by the BT clock of the master. The channel is divided into time slots where each slot corresponds to an RF hop frequency. Consecutive hops correspond to different RF hop frequencies. The nominal hop rate is 1,600 hops/second. All BT devices participating in the piconet are time- and hop-synchronized to the channel.

The channel is divided into time slots, each 625 µs in length. The time slots are numbered according to the BT clock of the piconet master. The slot numbering ranges from 0 to $2^{27}-1$ and is cyclic with a cycle length of $2^{27}$. In the time slots, master and slave can transmit packets. According to the BT specifications, a TDD scheme is used where master and slave alternatively transmit. The master starts its transmission in even-numbered time slots only, and the slaves starts their transmissions in odd-numbered time slots only. The packet start is aligned with the slot start. Packets transmitted by the master or the slaves may extend over up to five time slots.

The RF hop frequency shall remain fixed for the duration of the packet. For a single packet, the RF hop frequency to be used is derived from the current BT clock value. For a multi-slot packet, the RF hop frequency to be used for the entire packet is derived from the BT clock value in the first slot of the packet. The RF hop frequency in the first slot after a multi-slot packet uses the frequency as determined by the current BT clock value. If a packet occupies more than one time slot, the hop frequency applied is the hop frequency as applied in the time slot where the packet transmission was started.

Between master and slave(s), different types of links can be established. Two link types have been defined in the BT specifications: Synchronous Connection-Oriented (SCO) links, and Asynchronous Connection-Less (ACL) links. The SCO link is a point-to-point link between a master and a single slave in the piconet. The master maintains the SCO link by using reserved slots at regular intervals. The ACL link, by comparison, is a point-to-multipoint link between the master and all the slaves participating on the piconet. In the slots not reserved for SCO links, the master can exchange packets with any slave on a per-slot basis. The ACL link provides a packet-switched connection between the master and all active slaves participating in the piconet.

Data on the piconet channel is conveyed in packets. Each packet consists of three entities: the access code, the header, and the payload. The access code and header are of fixed size: 72 bits and 54 bits respectively. The payload can range from zero to a maximum of 2745 bits. Packets may include the access code only, the access code header, or the access code header payload. Sixteen different types of packets can be distinguished, four of which are pre-defined control types that are common to both link types. A 4-bit TYPE code, included in the header, specifies which packet type is used. The interpretation of the TYPE code depends on the physical link type associated with the packet. The device first determines whether the packet is sent on an SCO link or an ACL link, and then determines which type of SCO packet or ACL packet has been received. The TYPE code also indicates how many slots the current packet will occupy.

In an ACL link, the master can either broadcast packets to every slave in the piconet, or send packets to a particular slave. ACL packets not addressed to a specific slave are considered as broadcast packets and are read by all the slaves. In the reverse direction, the master controls slave access to the channel. According to the BT specification, under normal operating conditions only one slave transmits over the piconet channel during any particular time slot. The slaves therefore share the available bandwidth in the slave-to-master direction of the TDD channel.

In many applications, piconets are formed that include a relatively few number of slaves. For example, a computer can act as a master in a piconet with a slave printer or mouse. Here, the sharing of bandwidth amongst the slaves may not result in any significant degradation of performance. However, other scenarios may require that a master support a piconet having a greater number of slaves. For example, a network access point (NAP) provides wireless access to a network, such as the Internet or a local area network (LAN), to those BT devices within range of the NAP. NAPs can be used to provide convenient wireless access to the Internet, email, and other LAN resources. In typical business environments, and even some home environments, the NAP can often be expected to support up to the maximum 7 slaves. Performance in environments such as this can suffer where a relatively large number of slaves are sharing the available channel bandwidth.

What is needed therefore is an improved system and method whereby channel bandwidth is increased for those piconets having multiple slaves.

SUMMARY OF THE INVENTION

The present invention satisfies this need by providing a system and method for increasing the bandwidth of a TDD channel where multiple slave devices communicate with a master device over the channel. A master device can increase channel bandwidth by utilizing available transmit slots that occur during receipt of a multi-slot packet from a slave device. For example, the master device receives a first packet at a first frequency from a first slave via the channel. The master determines whether the first packet is a multi-slot packet, and if so, transmits a second packet to a second slave via the channel at a second frequency different from the first frequency. The second packet is transmitted after receipt of the first packet, but prior to the end of the first packet.

These and other aspects of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention provides a system and method for increasing the bandwidth of a TDD channel where multiple slaves communicate with a master over the channel. Generally speaking, according to the present invention wireless devices acting in the role of master utilize transmit opportunities that occur during reception of a multi-slot packet. Additional radios can be added to the master device to transmit the additional packets. Utilizing techniques according to the present invention, the master transmits over the channel while at the same time receiving a multi-slot packet with no interference between the transmissions. According to the BT specification, by comparison, only one device within a particular piconet transmits over the channel at any given time. Techniques according to the present invention effectively increase channel bandwidth relative to standard BT operation without violating the BT specification.

Example embodiments of the present invention in many instances are described herein in the context of an example BT communications environment. These techniques are applied to the BT environment for illustrative purposes only, and should not be construed as limited to this environment. Rather, it will be apparent to those of skill in the relevant art that the principles described herein can also be applied to other similar wireless communications environments wherein master and slave devices communicate over a TDD channel.

Figure 1:
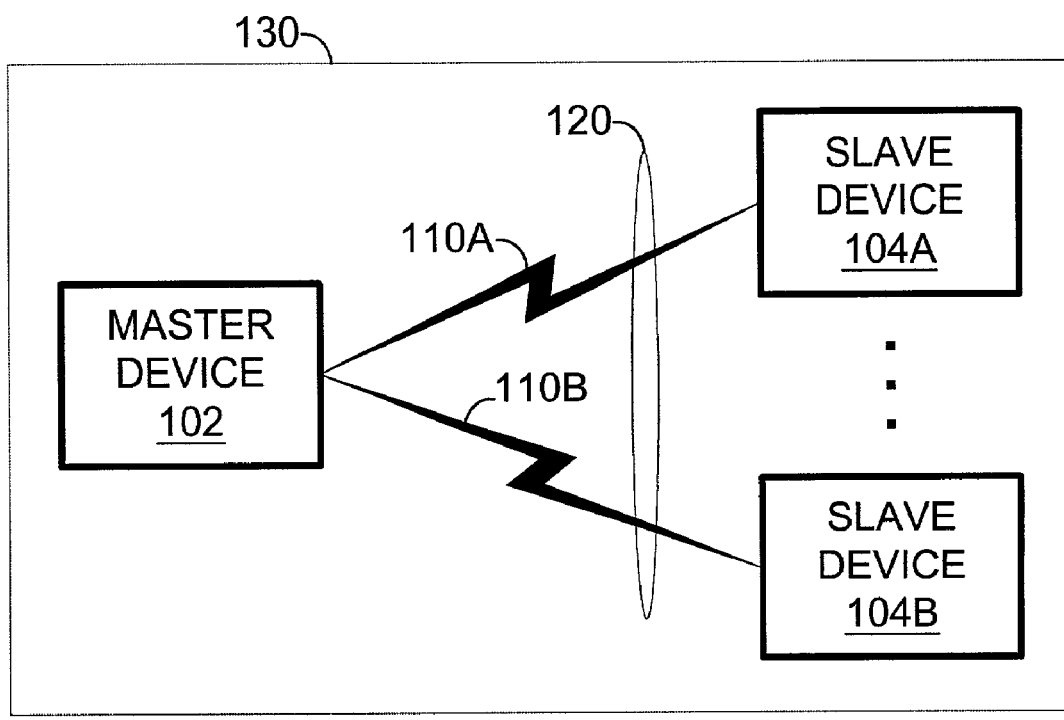
FIG. 1 depicts an example wireless communications environment within which various example embodiments of the present invention operate.

FIG. 1 depicts an example wireless communications environment 100 within which various example embodiments of the present invention operate. A master device 102 communicates with two or more slave devices 104 (shown as 104A and 104B). Wireless links 110 (shown as 110A and 110B) are established between master device 102 and each of the slave devices 104. The wireless links 110 together form a channel 120, and the master device 102 and slave devices 104 together form a wireless network 130. In the example BT environment, wireless links 110 represent short-range RF links wherein master and slave devices communicate according to the protocols described in the BT specification. Further, wireless network 130 represents a piconet, and channel 120 represents the TDD channel described in the BT specification. Various techniques according to the present invention are described herein for increasing the bandwidth of channel 120.

Master device 102 and slave devices 104 represent electronic devices that are each equipped with at least one wireless radio capable of establishing and exchanging information over wireless link 110. These devices can, for example, represent a wide range of consumer electronic devices such as a laptop computer, PDA, cordless telephone, stereo equipment, television or VCR. As will be apparent, these devices can represent both portable and non-portable devices. Master device 102 and slave devices 104 can represent identically or similarly configured devices that have been equipped according to the present invention. For example, master device 102 and slave devices 104A and 104B can represent three laptop computers in communication with one another, where one of the laptops is configured as master device 102 and the others as slave devices 104. Alternatively, master device 102 and slave devices 104 can represent dissimilar devices. For example, master device 102 might represent a laptop computer, slave device 104A a printer, and slave device 104B a PDA.

Though slave devices 104 are in some way subservient to master device 102, the precise roles of master and slave devices can vary according to the communication protocols followed within wireless network 130. In the example BT environment, slave devices 104 within a piconet synchronize to the timing of master device 102. Furthermore, access to channel 120 is controlled by master device 102. As will be apparent, many of the details concerning the master and slave roles are not pertinent to the operation of the various example embodiments of the present invention described herein. The master and slave roles are therefore described to the extent that they are pertinent. Techniques according to the present invention can be applied to other environments wherein the roles of master and slave are similarly defined.

The designation of one wireless device as master and the others as slaves can depend, at least in part, on the communication protocol(s) followed within wireless network 130. For example, according to the BT specification the wireless device that performs the paging procedure is initially designated as the master device, and the device that is paged is designated the slave device. However, various procedures are also defined for swapping master and slave roles. Furthermore, a wireless devices that acts as a master in one piconet can simultaneously act as a slave in another piconet. The techniques described herein according to the present invention can therefore be applied to whichever device happens to be acting in the role of master at any given time.

These techniques can be applied within many different specific configurations of wireless communications environment 100 to increase the bandwidth of channel 120. These techniques are particularly applicable to those environments where master devices 102 commonly communicate with a relatively large number of slave devices 104 within a wireless network. In the example BT environment, a piconet master can support up to seven active slave devices. The techniques described herein potentially provide increasingly greater bandwidth improvements (relative to the performance achieved through normal operation according to the BT specification) as the number of slaves in a piconet approaches the maximum of seven.

Figure 2:
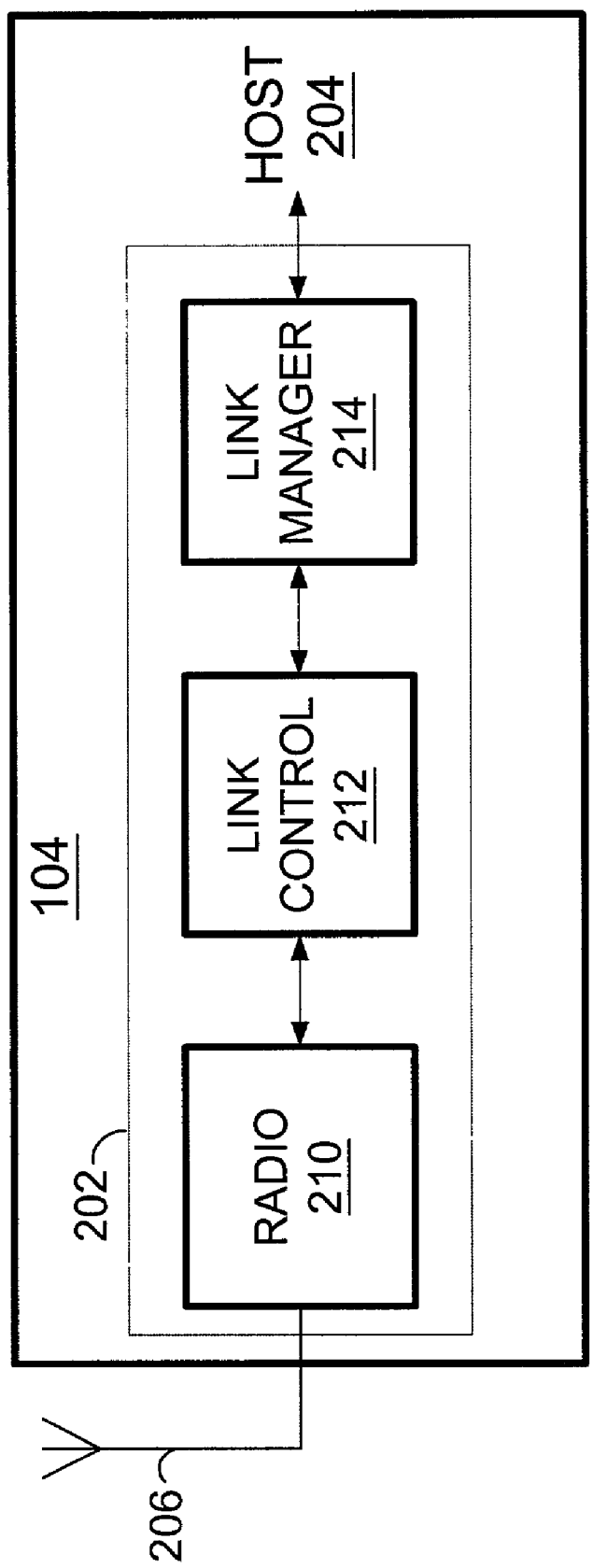
FIG. 2 depicts an example slave device in greater detail.

FIG. 2 depicts an example slave device 104 in greater detail. Slave device 104 includes a wireless transceiver 202 that provides wireless communication capability to a host system 204. Host system 204 represents the device that employs wireless transceiver 202 to communicate data via wireless link 110. Example host systems 202 can include both sophisticated computing devices such as a personal computer or PDA running a wide variety of software, as well as less sophisticated devices such as a VCR or audio speaker. Equipped with wireless transceiver 202, these host systems are able to communicate wirelessly with other similarly equipped devices.

Wireless transceiver 202 establishes and communicates information (e.g., data, voice) via wireless link 110. In the example BT environment, wireless transceiver 202 can represent a BT microchip transceiver, such as the Bluetooth™ Module (part number ROK 101 007) produced by Ericsson. According to the BT specification, wireless transceiver 202 includes a 2.4 GHz radio 210, a link control 212, and a link manager 214. Link control 212 represents the software that carries out the baseband protocols and other low-level link routines. Link manager 214 represents a support unit for link management and host terminal interface functions. Link manager 214 implements the link manager protocol, including link layer messages for link set-up and control. Radio 210 provides the RF interface between host system 204 and wireless link 110.

Figure 3:
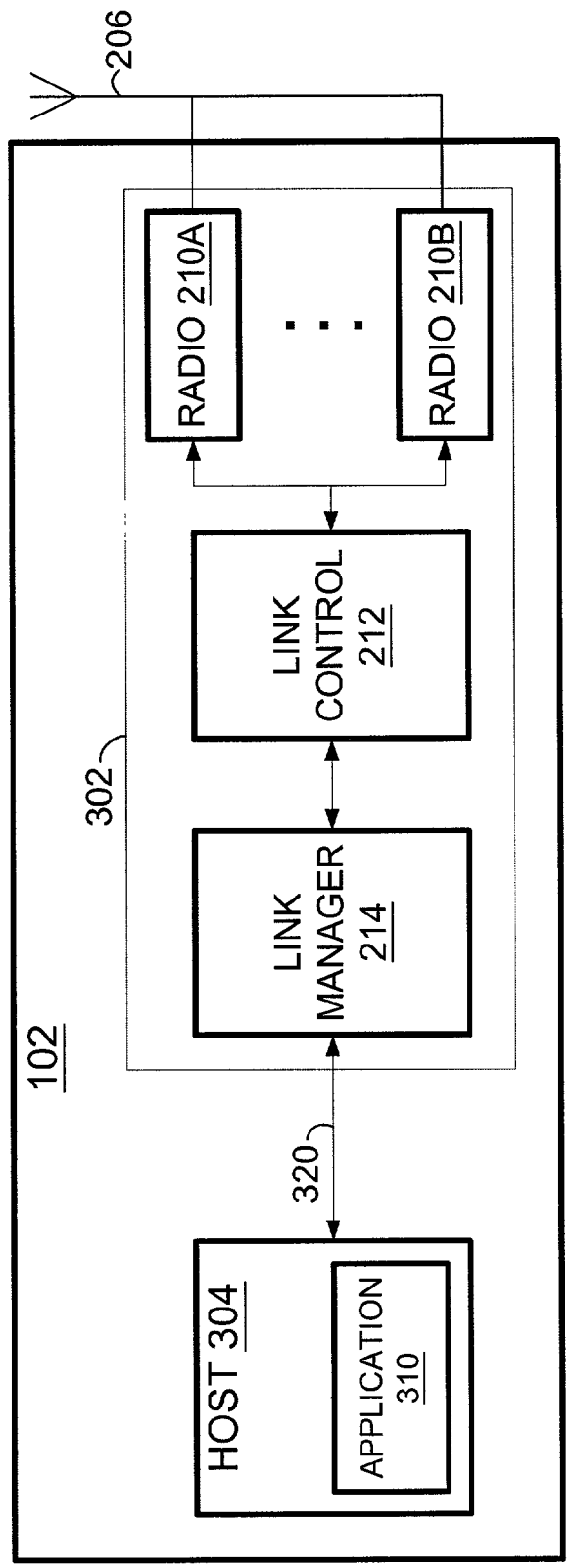
FIG. 3 depicts a master device in greater detail according to an example embodiment of the present invention.

FIG. 3 depicts master device 102 in greater detail according to an example embodiment of the present invention. As with slave device 104, master device 102 includes a wireless transceiver 302 that provides wireless communication capability to a host system 304. Host system 304 includes an application 310 representing the software that directs the operation of wireless transceiver 304. Application 310 can include, for example, program code for directing master device 102 to perform the techniques described herein. Host system 304 communicates with wireless transceiver 302 via a link 320 according to a pre-defined protocol. In the example BT environment, link 320 represents a universal asynchronous receiver transmitter (UART) serial link, where host system 304 and wireless transceiver 302 communicate using the host controller interface (HCI) protocol defined in the BT specification.

The present invention can include one or more computer programs which cause wireless devices to perform the functions described herein and illustrated in the appended flowcharts. However, it should be apparent that there could be many different ways of implementing the invention in computer programming, or a combination of hardware and software, and the invention should not be construed as limited to any one set of computer program instructions. Further, a skilled programmer would be able to write such a computer program to implement the disclosed invention without difficulty based on the flowcharts and associated written description included herein. Therefore, disclosure of a particular set of program code instructions is not considered necessary for an adequate understanding of how to make and use the invention.

Wireless transceiver 302 includes two or more radios 210 (shown as 210A and 210B) in addition to link manager 214 and link control 212. As will now be described in greater detail, having additional radios 210 allows master device 102 to utilize transmit slots during a multi-slot packet send by a slave device.

Figure 4:
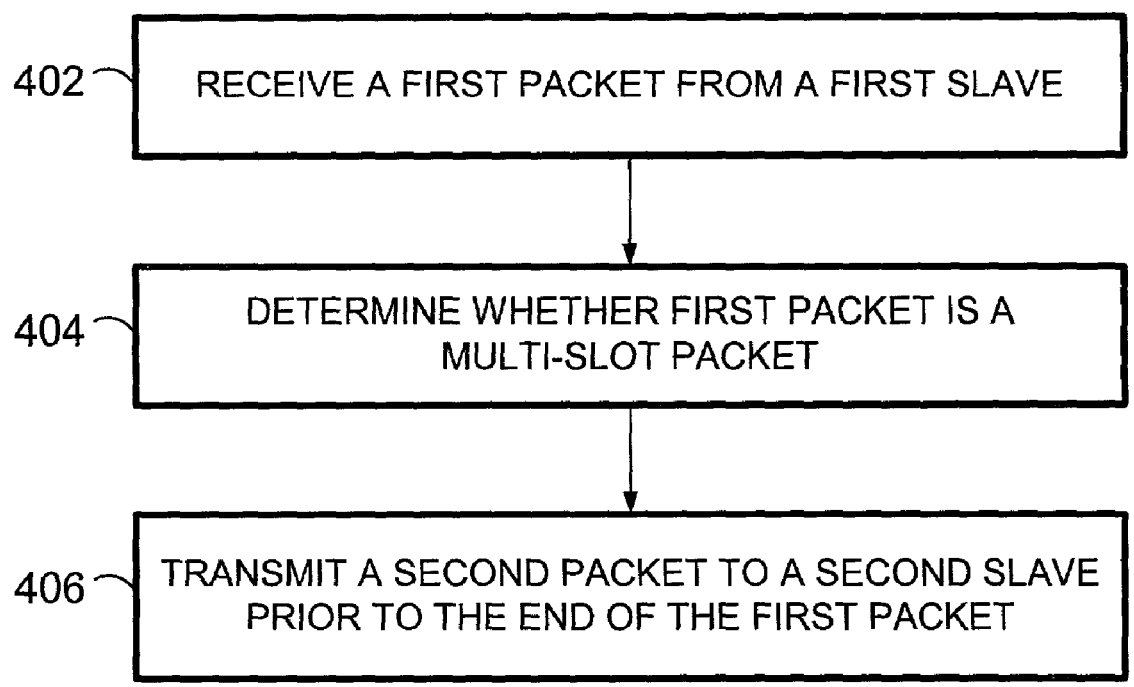
FIG. 4 depicts a flowchart that describes the operation of a master device according to an example embodiment of the present invention.
Figure 5:
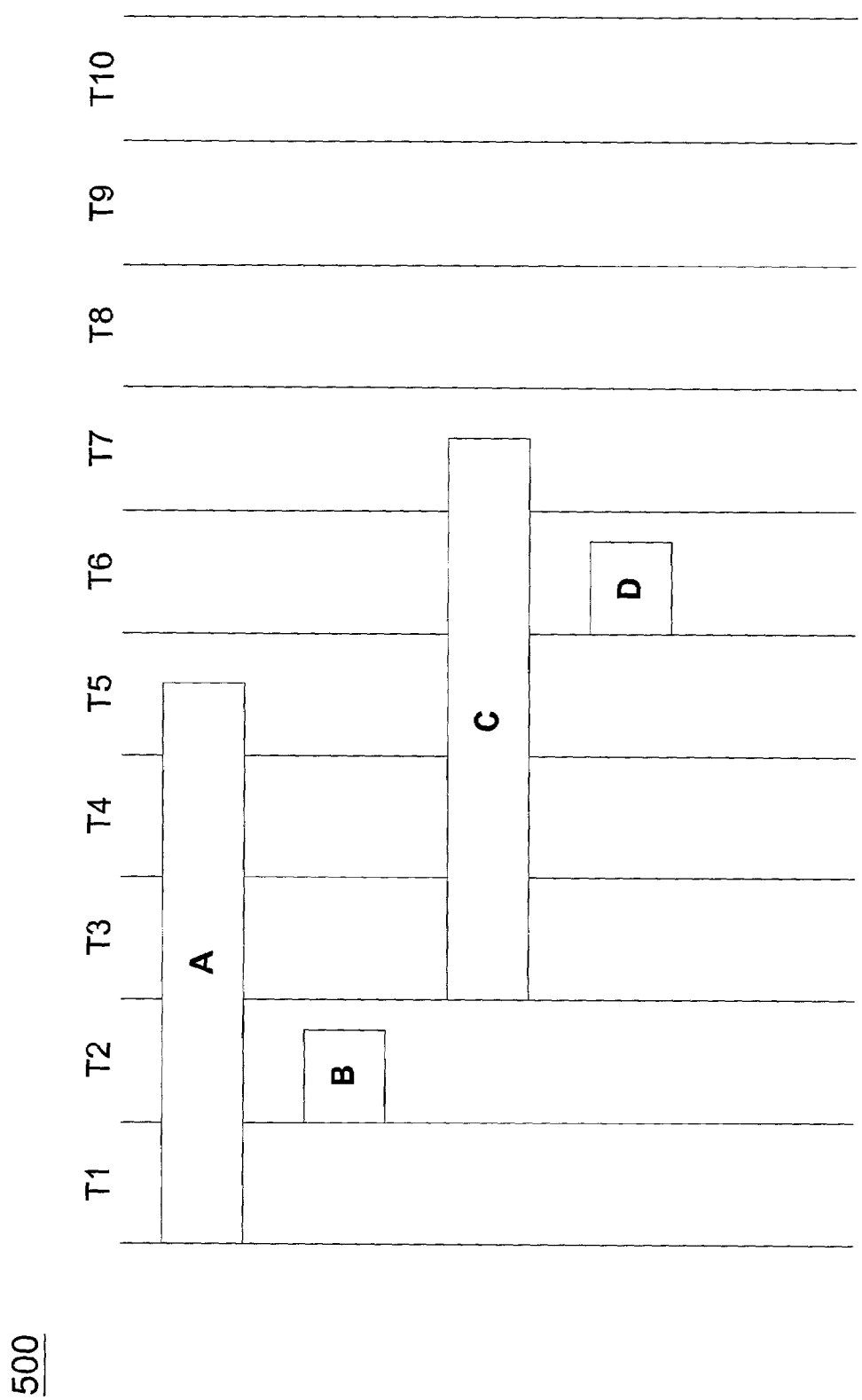
FIG. 5 depicts a timing diagram that illustrates example operations according to the present invention using a master device having two radios.

FIG. 4 depicts a flowchart 400 that describes the operation of master device 102 according to an example embodiment of the present invention. These operations will be described in the context of the example BT environment, and in conjunction with FIGS. 5, 6, and 7 which depict example timing diagrams. Timing diagram 500 depicted in FIG. 5 is divided into ten time slots, labeled T1 through T10, that represent example time slots from channel 120 that could occur anywhere within the hop code. Channel 120 is divided into time slots where each slot corresponds to an RF hop frequency. Consecutive hops correspond to different RF hop frequencies. According to the TDD scheme described in the BT specification, master device 102 and slave devices 104 transmit in alternating time slots over channel 120. Master device 102 can start its transmissions in even-numbered time slots only, whereas slave devices 104 can start their transmissions in odd-numbered time slots only. Packets transmitted by master device 102 or slave devices 104 may extend over up to five time slots. The RF hop frequency remains fixed for the duration of the packet. Single-slot packets use the RF hop frequency associated with the slot during which the packet is transmitted. For a multi-slot packet, the entire packet is transmitted at the RF frequency associated with the first slot of the packet.

Consider example wireless environment 100, wherein master device 102 is in communication with slave devices 104A and 104B. Master device 102 has established wireless links 110A and 110B according to the procedures described in the BT specification. Slave devices 104A and 104B are also operating in accordance with the BT specification, and are therefore sharing the bandwidth of the TDD channel 120 with master device 102.

In operation 402, master device 102 receives a first packet from a first slave device 104. This first packet is transmitted at the RF hop frequency corresponding to the first time slot that the packet occupies. For example, assume that master device 102 receives a packet from slave device 104A via wireless link 110A. This packet is shown as packet A in FIG. 5. Packet A is sent by slave device 104A and received by master device 102 during time slot T1. Packet A is transmitted at a frequency f1 corresponding to time slot T1. The propagation delay is negligible, given that wireless link 110A represents a short-range wireless connection.

In operation 404, master device 102 determines whether the first packet is a multi-slot packet. As will be apparent, this determination can be made in a number of different ways, depending upon the particular communication protocols employed within channel 120. For example, according to the BT specifications, master device 102 can determine whether a packet is a multi-slot packet by examining the packet header. The BT specification provides for twelve different packet types that can be defined for each of the SCO and ACL link types. A 4-bit TYPE code is included in the packet header to indicate the different packets on a link. Packets occupying one, three, and five time slots have been defined in the BT specifications. Master device 102 can infer the slot-length of a packet received from a slave device by decoding the packet header and examining the TYPE code. Packets occupying three or five time slots are determined to be multi-slot packets.

In example timing diagram 500, master device 102 decodes the header of packet A, and examines the packet type code which indicates that packet A has a length of five slots. Master device 102 therefore determines that packet A is a multi-slot packet.

In operation 406, master device 102 transmits a second packet to a second slave device prior to the end of the first packet. The second packet can be of any allowable length. Under normal BT operating conditions, master device 102 waits until the first slave device finishes transmitting the first packet before beginning to transmit the next packet. As applied to example timing diagram 500, master device 102 would wait until time slot T6 before transmitting packet B. Furthermore, master devices 102 having a single radio 210 would be unable to transmit a second packet while simultaneously receiving the first packet.

However, according to the present invention, master device 102 begins transmitting a second packet to a second slave device (any slave in the piconet other than the first slave), and if this second transmission occurs prior to the end of the first packet, then channel bandwidth is increased. According to the BT specification, even though the first slave is transmitting a multi-slot packet, all the other slaves in the piconet will be listening during even-numbered time slots at the corresponding frequencies for transmissions from the master. As a result, master device 102 can begin transmitting a second packet during any even numbered time slot and the slave device to which the packet is directed will be listening at the correct frequency. If master device 102 begins transmission of the second packet prior to the end of the first packet, the effective bandwidth of channel 120 is increased. This second packet can be sent to any slave in the piconet other than the first slave that is already engaged in transmitting the first packet. Moreover, the transmission of the second packet will not interfere with the first packet because they are being transmitted at different frequencies. Therefore, according to the present invention, master device 102 utilizes available transmit slots during a multi-slot packet send by a slave to send packets to another slave, resulting in increased channel bandwidth.

For example, referring to timing diagram 500, master device 102 begins transmitting packet B to slave 104B in time slot T2 at a frequency f2. The transmission of packet B does not interfere with packet A, because frequency f2 is different than frequency f1. Master device 102 could alternatively begin transmitting packet B to slave 104B in time slot T4 at a frequency f4. In either event, the bandwidth of channel 120 is increased, though there is a potential for additional increases in bandwidth if the earlier time slot is used.

According to an example embodiment of the present invention, master device 102 is equipped with at least one additional radio 210 in order to transmit the second packet prior to the end of the first multi-slot packet. Referring back to example master device 102 depicted in FIG. 3, radio 210A can be used, for example, to receive packet A during time slots T1 through T5, while radio 210B is used to transmit packet B beginning at time slot T2 or T4.

Operations 402 through 406 can be repeated for each packet that is received by master device 102, so long as master device 102 has an available radio 210 that is not currently in use either transmitting or receiving a packet. For example, as shown in timing diagram 500, master device 102 receives packet C from slave 104B during time slot T3. Master device 102 employs radio 210B to receive packet C. In operation 404, master device 102 determines that packet C is a multi-slot packet. If master device 102 is only equipped with two radios 210, master device 102 must wait until one of the radios is available before transmitting the next packet. This scenario is depicted in timing diagram 500. At time slot T3, radio 210A is still busy receiving packet A and radio 210B is busy receiving packet C. Radio 210A becomes available in time slot T6 upon finishing receipt of packet A in time slot T5 As shown, master device 102 therefore employs radio 210A in time slot T6 to transmit packet D to slave device 104A.

Figure 6:
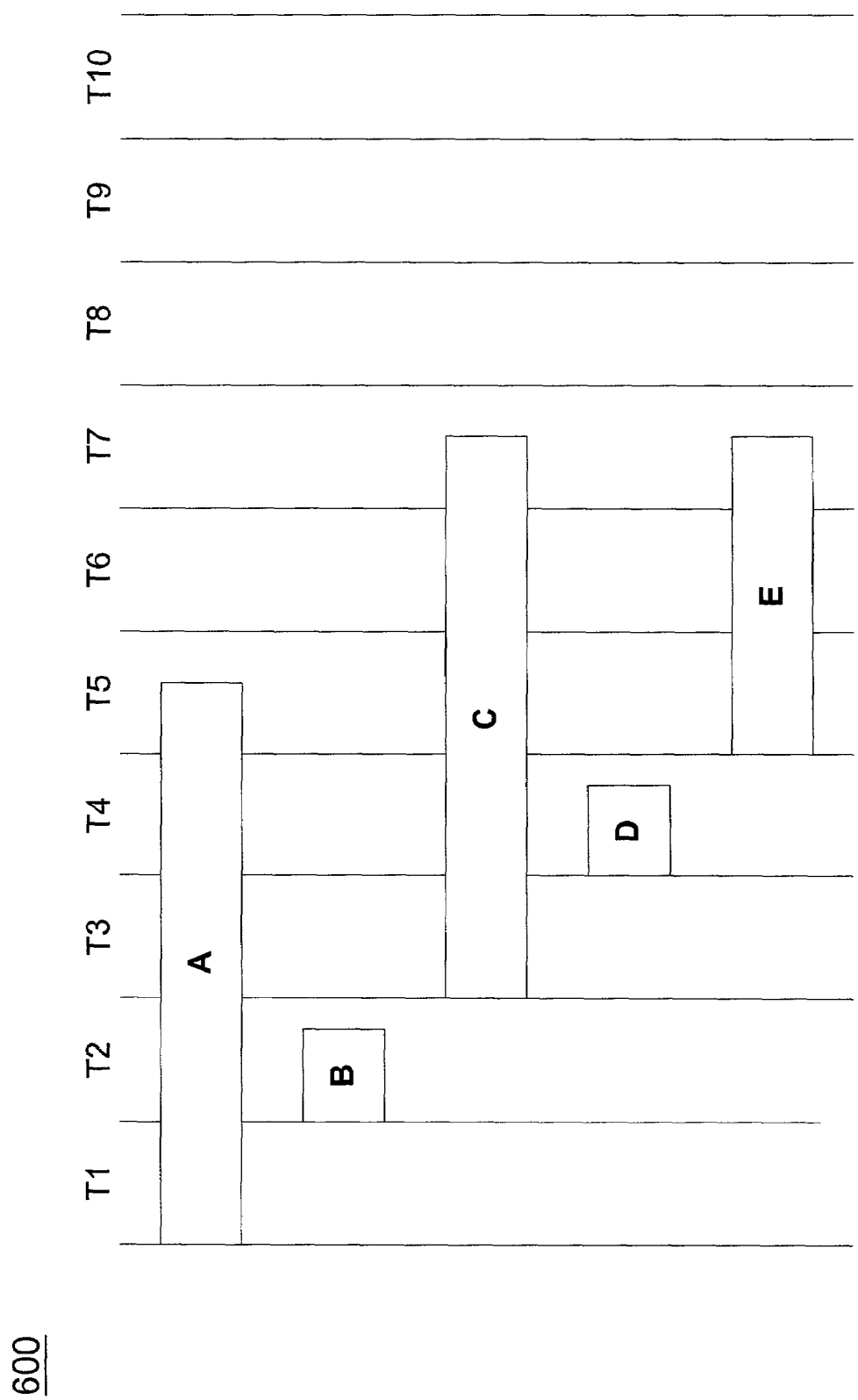
FIG. 6 depicts a timing diagram that illustrates example operations according to the present invention using a master device having three radios.

However, if master device 102 is equipped with a third radio 210C (not shown), then master device 102 may begin transmitting the next packet without waiting for either radio 210A or 210B to become available. FIG. 6 depicts an example timing diagram 600 that illustrates this scenario. As shown in FIG. 6, master device 102 employs radio 210C to begin transmitting packet D during time slot T4 to a third slave device 104C (not shown) in piconet 130. Therefore, at time slot T4 radio 210A is receiving packet A from slave 104A, radio 210B is receiving packet C from slave 104B, and radio 210C is transmitting packet D to slave 104C. Radio 210C then begins receiving a three-slot packet (packet E) from slave 104C during time slot T5 In operation 404, master 102 determines that packet E is a multi-slot packet, and that radio 210A will be available in time slot T6 for additional transmissions. In this manner, operations 402 through 406 are repeated to employ radios 210 as they become available.

Figure 7:
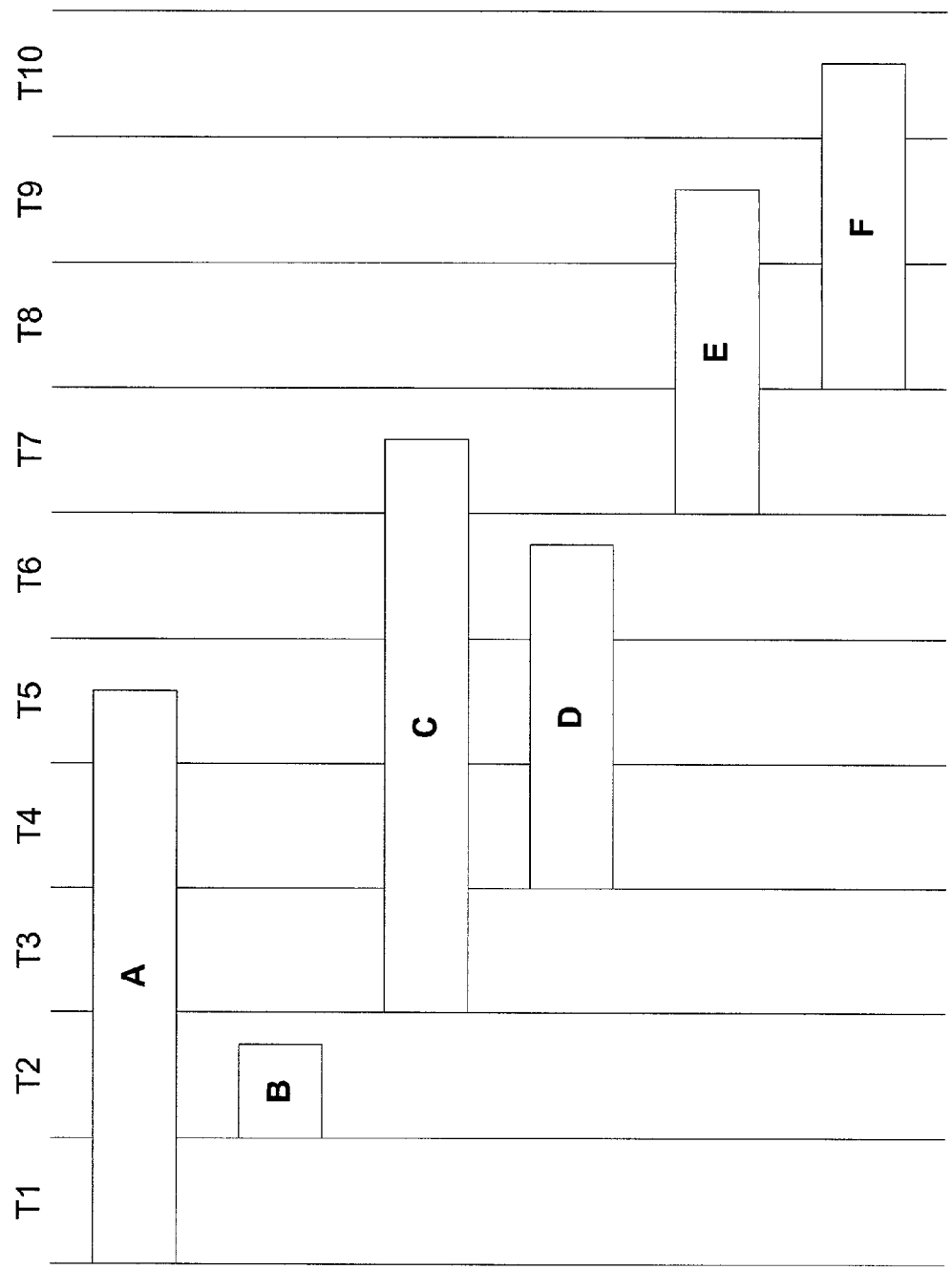
FIG. 7 depicts a timing diagram that illustrates a master device transmitting a new packet after completing a previous multi-slot transmission.

According to the BT specification, slave devices 104 do not listen for transmissions from the master upon determining that the master is transmitting a multi-slot packet. As a result, in the example BT environment, master device 102 should not begin to transmit a new packet once the master is in the midst of a multi-slot transmission, even if a radio is available. This is because slave devices 104, operating according to the BT specification, won't be listening during this time. FIG. 7 depicts a timing diagram 700 that illustrates this scenario. In this example, packet D is a three-slot packet. Master device 102 begins transmitting packet D to slave 104C at time slot T4 At time slot T6, radio 210A is available after finishing the transmission of packet A in time slot T5. Master 102 could therefore employ radio 210A to begin transmitting a new packet at time slot T6. However, the slaves all received packet D, determined that master device 102 was transmitting a multi-slot packet, and therefore sleep for the remainder of the packet D transmission. The slave devices 102 only begin to listen again for transmissions from the master in the next available master transmit slot after awakening, i.e., time slot T8 So, according to an example embodiment of the present invention, master device 102 waits until it finishes transmitting the multi-slot packet D before transmitting new packet F in time slot T8 As shown in FIG. 7, master device 102 begins receiving packet E from slave C in time slot T7.

When determining the number of radios 210 to include within master device 102, there is a tradeoff between expense (e.g., in terms of cost, complexity, chip real estate) and capabilities. Adding additional radios 210 may result in increased channel bandwidth, but will increase expenses associated with master device 102. In the example BT environment, master devices 102 having two radios 210 represents a good compromise between these cost/benefit tradeoffs. In any event, given that the maximum length of packets defined by the BT specification is five time slots and that masters are only allowed to begin transmitting every other slot, no additional benefits are gained by having more than three radios 210 in any single master device 102.

According to another example embodiment of the present invention, the techniques described herein can be at least partially implemented by adding a receive-only radio (not shown) to master device 102. Referring back to example timing diagram 500 in FIG. 5, master device 102 could employ the receive-only radio to receive packet A at time slot T1. Master device 102 could then employ radio 210 to transmit packet B during time slot T2, and then to receive packet C at time slot T3. However, once the receive-only radio has completed reception of packet A at time slot T5, master device 102 will not be able to transmit another packet in the next available master transmit slot, T6. This is because the receive-only radio is not capable of transmitting, and the other radio 210 is still busy receiving packet C. Master device 102 could therefore transmit the next packet at time slot T8, once packet C has been completely received at time slot T7.

Figure 8:
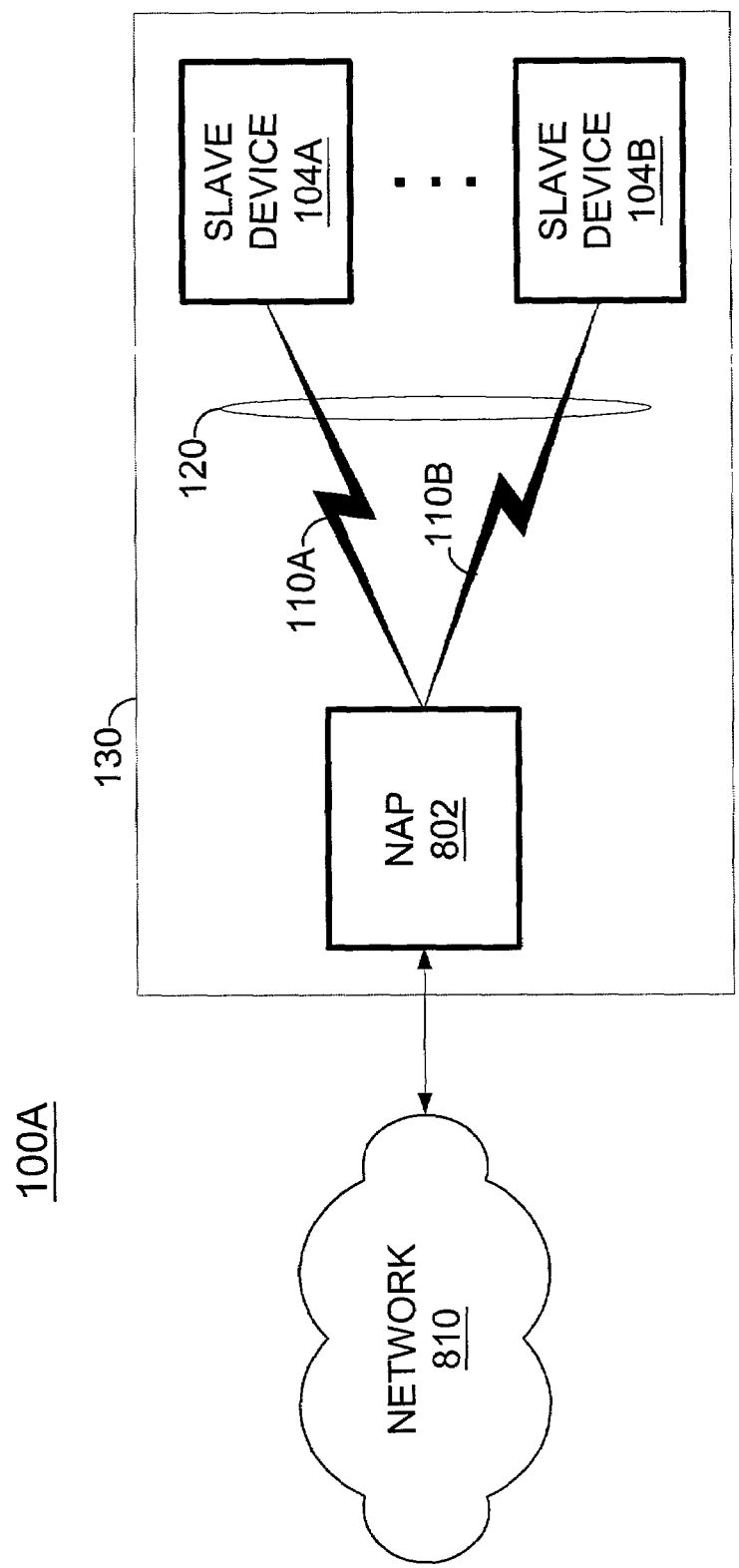
FIG. 8 depicts an example wireless environment wherein multiple slave devices communicate with a NAP to gain access to network resources.

The techniques according to the present invention for increasing channel bandwidth are particularly applicable in situations where a particular wireless device is known to operate as a master in piconets having multiple slaves. FIG. 8 depicts just such an environment, wherein slave devices 104 communicate with a NAP 802 to gain access to a network 810. NAP 802 can be used, for example, within a home or business to provide wireless access to network resources. Network 810 can represent, for example, the Internet, a LAN, or any other communications network over which data may be exchanged. NAPs 802 will commonly be expected to simultaneously support connections to multiple devices. According to the BT specification, any wireless device that supports simultaneous connections must be the piconet master. NAPs 202 must therefore act as a master device 102, and those devices attempting to gain network access act as slave devices 104.

Figure 9:
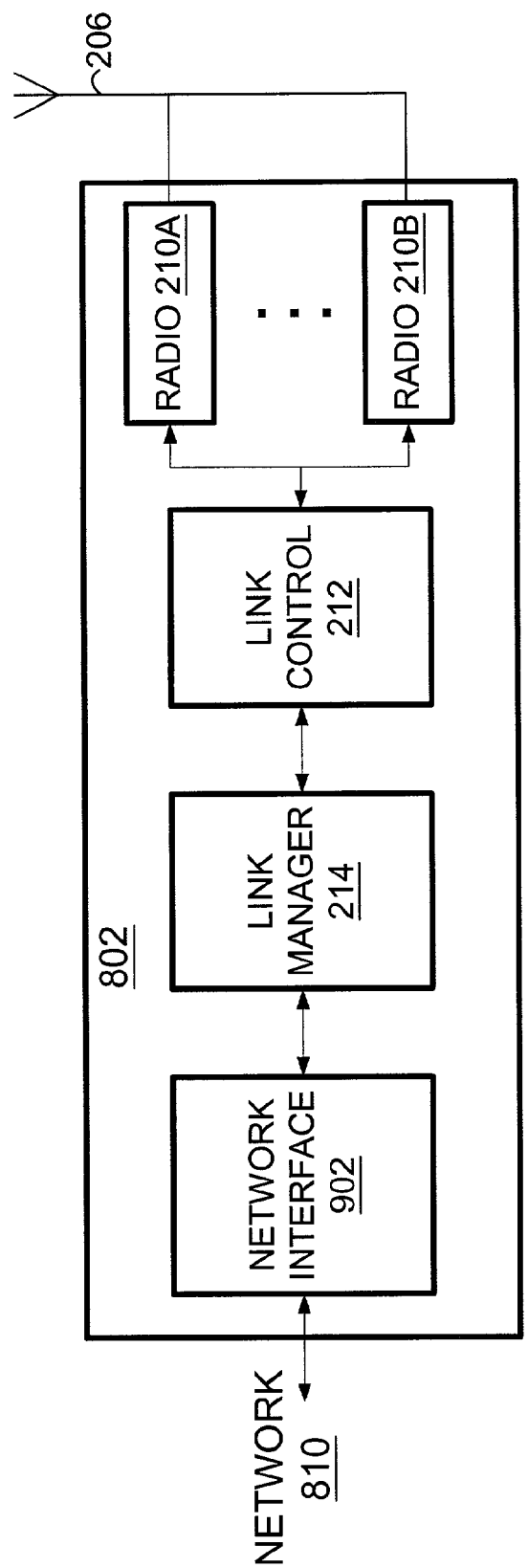
FIG. 9 depicts a NAP in greater detail according to an example embodiment of the present invention.

FIG. 9 depicts NAP 802 in greater detail according to an example embodiment of the present invention. As shown in FIG. 9, NAP 802 includes link manager 214, link control 212, and two or more radios 210. NAP 802 further includes a network interface 902 for communicating with network 810. Here, network interface 902 is analogous to the host system described above with respect to FIG. 3.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for communicating over a time-division duplex channel, comprising:
   (a) receiving a first packet at a first frequency from a first slave device via the channel, wherein said first packet is received beginning at a first slot; and
   (b) determining whether said first packet is a multi-slot packet, and if so, transmitting a second packet to a second slave device via the channel at a second frequency different from said first frequency, wherein said second packet is transmitted after said first slot and prior to the end of said first packet.

2. The method of claim 1, wherein said first packet comprises a header having a packet type code indicative of the slot length of said first packet, and said determining comprises inferring whether said first packet is a multi-slot packet based on said packet type code.

3. The method of claim 1, wherein said second packet is transmitted during a first available transmit slot.

4. A computer readable media embodying a method for communicating over a time-division duplex channel, the method comprising:
   (a) receiving a first packet at a first frequency from a first slave device via the channel, wherein said first packet is received beginning at a first slot; and
   (b) determining whether said first packet is a multi-slot packet, and if so, transmitting a second packet to a second slave device via the channel at a second frequency different from said first frequency, wherein said second packet is transmitted after said first slot and prior to the end of said first packet.

5. The computer readable media of claim 4, wherein said first packet comprises a header having a packet type code indicative of the slot length of said first packet, and said determining comprises inferring whether said first packet is a multi-slot packet based on said packet type code.

6. The computer readable media of claim 4, wherein said second packet is transmitted during the first available transmit slot.

7. A wireless device for communicating over a time-division duplex channel, said wireless device comprising:
   (a) a first radio configured to receive a multi-slot packet at a first frequency from a first slave via the channel, wherein said multi-slot packet is received during a first slot;
   (b) means for determining whether said first packet is a multi-slot packet; and
   (c) a second radio configured to transmit a second packet to a second slave responsive to said means making a positive determination, wherein said second packet is transmitted via the channel at a second frequency different from said first frequency after said first slot and prior to the end of said first packet.

8. The wireless device of claim 7, wherein said wireless device acts as a master to said first slave and said second slave.

9. The wireless device of claim 7, wherein said wireless device comprises a network access point coupled to a network.

10. The wireless device of claim 7, wherein said first radio comprises a receive-only radio.

11. The wireless device of claim 7, wherein said first and second radios comprise 2.4 GHz Bluetooth radios.

12. The wireless device of claim 7, wherein said first packet comprises a header having a packet type code indicative of the slot length of said first packet, and said means for determining comprises means for inferring whether said first packet is a multi-slot packet based on said packet type code.

13. The wireless device of claim 7, wherein said second packet is transmitted during the first available transmit slot.

14. A system comprising:
   (a) a time-division duplex channel;
   (b) a first slave device configured to transmit a first packet over said time-division duplex channel at a first frequency during a first time slot;
   (c) a master device, configured to receive said first packet, to determine whether said first packet is a multi-slot packet, and if so, to transmit a second packet over said time-division duplex channel at a second frequency different from said first frequency, wherein said second packet is transmitted after said first slot and prior to the end of said first packet; and
   (d) a second slave device configured to receive said second packet.

15. The system of claim 14, wherein said master device is master of a piconet that includes said first slave and said second slave.

16. The system of claim 14, wherein said master device comprises a network access point coupled to a network.

17. The system of claim 14, wherein said first packet comprises a header having a packet type code indicative of the slot length of said first packet, and wherein said master device is configured to infer whether said first packet is a multi-slot packet based on said packet type code.

18. The system of claim 14, wherein said second packet is transmitted during the first available transmit slot.

* * * * *